United States Patent [19]

Gyi

[11] Patent Number: 4,707,752
[45] Date of Patent: Nov. 17, 1987

[54] SPACER MEANS ON FLOPPY DISKS AND ASSOCIATED TECHNIQUES

[75] Inventor: Ko K. Gyi, Thousand Oaks, Calif.

[73] Assignee: Unisys Corp., Detroit, Mich.

[21] Appl. No.: 446,276

[22] Filed: Dec. 2, 1982

[51] Int. Cl.$^4$ .................. G11B 5/016; G11B 23/02
[52] U.S. Cl. ............................. 360/99; 360/98; 360/133
[58] Field of Search .................. 360/97–99, 360/133, 135; 206/444; 346/137

[56] References Cited

U.S. PATENT DOCUMENTS

| | | | |
|---|---|---|---|
| 3,867,723 | 2/1975 | Penfold et al. | 360/98 |
| 3,936,880 | 2/1976 | McGinnis et al. | 360/99 |
| 3,969,767 | 7/1976 | Griffiths et al. | 360/99 |
| 4,011,591 | 3/1977 | Orlando et al. | 360/98 |
| 4,019,204 | 4/1977 | Griffiths et al. | 360/99 |
| 4,086,641 | 4/1978 | Ragle et al. | 360/133 |
| 4,167,029 | 9/1979 | Ragle et al. | 360/99 |
| 4,185,311 | 1/1980 | Gyi et al. | 360/99 |
| 4,229,774 | 10/1980 | Janssen et al. | 360/99 |
| 4,327,386 | 4/1982 | Demoss et al. | 360/99 |
| 4,345,285 | 8/1982 | Demoss et al. | 360/99 |

OTHER PUBLICATIONS

IBM/TDB, vol. 17, No. 8, Jan. 1975, p. 2370, "Controlled Spacing of Stacked Flexible Magnetic Disks", by Kendall.

*Primary Examiner*—John H. Wolff
*Attorney, Agent, or Firm*—John J. McCormack; Nathan Cass; Kevin R. Peterson

[57] ABSTRACT

Improved spacer means for flexible magnetic disk pack storage systems are illustrated in the embodiments, each preferably comprising a set of fingers arrayed on each disk.

5 Claims, 10 Drawing Figures

SPACER MEANS ON FLOPPY DISKS AND ASSOCIATED TECHNIQUES

BACKGROUND OF THE INVENTION

The present invention relates to flexible magnetic disk packs; in particular it relates to improved vented spacer means therefor.

As workers in the art are well aware, flexible magnetic disk records, or floppy disks, are becoming increasingly popular, especially as used for data storage with data processing systems (in particular as "floppy" disk packs). "Floppies" became commercially significant in the 1970's, offering a low cost medium, with more acceptable "access time" (e.g., as opposed to magnetic tape systems).

"Floppy disks" can serve as a "unit record" medium that is compact, light, and is readily transported, stored, and bundled, interchangably wiht other like disks. They may be fashioned from well-known polyester sheet material (e.g., the familiar polyethylene terephthalate used for magnetic tape) with a magnetic coating thereon—this plastic being simply cut into the shape of a circular disk with a central mounting hole to accommodate the familiar drive spindle. Such a "prior art" floppy disk is well known to workers and is shown and described in U.S. Pat. No. 4,086,640, filed Aug. 4, 1976 entitled "Partitionable Portable Flexible Disk Pack", by Herbert U. Ragle and Dean DeMoss commonly assigned herewith and hereby incorporated by reference herein to the extent relevant.

The present invention is directed toward improving the functioning of a pack of such flexible magnetic disks, as collected into a "floppy pack" and rotated at high rpm— in particular by intoducing improved "bi-part oppositely scalloped" spacer means. Such spacer means is adapted to accommodate automatic pneumatic partition means employed to split the pack and expose any selected disk surface for Read/Write operations. An improved "floppy disk pack" according to the invention will be seen thus rendered—one particularly adapted for such partitioning, using surprisingly simple means and methods, as described hereinafter.

PRIOR DESIGN OF FLOPPY PACKS, SPACERS

Workers are familiar with prior approaches to the design and manufacture of floppy disks and to related equipment for handling them. Several are described in U.S. Pat. No. 4,086,640 cited above. With floppy disk packs it is of paramount importance to minimize pack cost, while yet maintaining accurate, reliable operation (e.g., partitioning). Thus, it is desirable to fabricate disk pack elements (e.g., spacers) from commonly available, inexpensive means. It is particularly desirable to simplify containment elements like spacers.

The invention teaches a novel spacer construction and associated techniques, using surprisingly simple, commonly-available expedients. For example, with the invention a set of disks may be stacked with a simple two-part vented spacer set between each disk affording the "automatic pneumatic-partition" characteristics desired. Using a prescribed partitioning pack-hub, such a pack will exhibit such desired advantages as "self-pumping" and "bistable selection-stability" as well as rotational stability.

According to a further feature, such a flexible disk pack with a bi-part vented spacer arrangement is especially adapted for pneumatic selection via the pack-hub, using a very simple centrally apertured hollow cylinder—one that is axially translated along the hub to position a jet port adjacent a selected inter-disk gap. Workers who appreciate the remarkable character of "floppy packs" in general will best appreciate these features and their surprising effectiveness, despite their surprising simplicity and unexpected versatility. For instance, it was quite unexpected that with spacer elements so modified, yet simplified, one could nonetheless produce a radially-vented spacer set adequate for partition with such high speed and with fins precision, while yet maintaining disk stability, even as diverted.

The present invention is directed toward providing improved spacer means, better adapted to meet the foregoing problems and objectives in a manner satisfying minimum-cost objectives. The invention maintains the convenience of packaging such spacer-sets between a number of floppy disks in a convenient unit record file ("pack"), while prescribing improved simplified techniques for fabricating the spacers and the floppy stack.

PARTITIONING A "FLOPPY PACK"; PRIOR ART

Workers have become greatly concerned over how to quickly and efficiently "partition" a stack of flexible disks; that is, how to displace and/or deflect the pack away from a selected disk surface to provide clearance for entry and manipulation of a transducer assembly. For instance, in a pneumatically-driven approach (see U.S. Pat. No. 3,618,055 to Van Acker and U.S. Pat. No. 3,509,533 to Krijan), sir is pumped from "slotted spindle" into the stack. Along this line, some workers (e.g., see U.S. Pat. No. 3,867,723 to Penfold et al.) have felt that a radially-outward flow of pressurized air between adjacent disks had a stabilizing effect, especially when the flow is uniform about the pack circumference; accordingly, they have proposed providing apertured (e.g., perforate) spacers between the stacked flexible disks to accommodate such an air flow.

For instance, in U.S. Pat. No. 3,969,767 to Griffiths, et al. "spacer-washers" are proposed to separate disks in a disk file. Each "washer" is "singular", is flexible and has a set of circumferentially-spaced axial projections serving to define ports for the exit of air radially from a central duct, the outward flow passing between adjacent flexible record disks which the spacers support. Such washers are further proposed as including an inner seat and made resilient to allow them to be clamped together and engaged for absorbing and controlling the forces holding the disk pack together. Such an array can be visualized as a laminated tubular "perforate-washer spindle", the semi-rigid washers being stacked to form an air-permeable spindle for coxially supporting the pack. A like arrangement is shown in IBM Technical Disclosure Bulletin, Vol. 20 #2 July 1977, page 693 where metal spacer disks are used having channels to conduct air radially from a floppy pack hub into the gaps between disks. Here also, a slotted piston is used to project air through such a spacer so as to produce a partitioning pressure imbalance in a selected gap.

The present invention involves a different spacer means—one formed of a pair of complementary rings (not one)—the rings being "oppositely-scalloped" and thus very simple and inexpensive to manufacture, yet surprisingly effective for partition through-flow. The (above and other) related spacers are identical and are not used in complementarily apertured pairs as with the invention. They are also relatively difficult and costly to fabricate in volume.

FLUID DYNAMICS OF DISK PARTITIONING

Workers have found it convenient to use a "jet-piston" reciprocating along the pack hub to supply pressurized air between disks in a floppy pack. This piston may be cylidrical, hollow and axially translateable, with a transverse gap intermediate its length—the gap adapted to generate the desired radial "air-jet" between selected disks for "partitioning" (e.g., as described in U.S. Ser. No. 774,312 cited below). Such a "jet hub" is thus adapted to be accurately translated along the inner hollow axis of the mentioned stack and to be selectively positioned so as to direct this partitioning air jet to displace any two adjacent disks.

Such a jet can so disturb the nominal pneumatic forces between "stable" disks as to control volumetric air flow between disks. That is, with inter-disk air flow equilibrated, the disks tend to stabilize in equidistant relation; whereas selectively increasing air flow between a particular disk pair will tend to thrust that pair further apart. Also, interrupting such a radially-outward air flow between disks tends to pull them together and hold them somewhat compressed.

In light of such observations—and as a salient feature—the instant invention teaches providing a stack of flexible disks with the mentioned pair of complementarily apertured spacer annuli between each disk, to be used, preferably together with such a jet-piston pneumatic partition arrangement.

Such an arrangement has been found to offer considerable advantage where rapid, reliable separation is required at high disk rpm, especially for relatively thick packs (e.g., several hundred disks).

As mentioned, the flexible disk packs and associated manipulating mechanisms according to the invention are particularly apt for "high speed" systems. Such "high speed" systems will be better understood from the parameters recited herein (e.g., see our copending, commonly assigned U.S. Ser. No. 774,312, filed Mar. 4, 1977 and entitled "High Performance Floppy Pack and Associated System"; herewith incorporated by reference).

Thus, the invention may be generally understood, in one light, as involving an improved pack of flexible recording disks held in a prescribed stack between air-permeable spacers and adapted to be partitioned pneumatically with central hollow cylinder means directing an air jet radially out through a prescribed registering "two-ring" spacer set, the spacer set location corresponding to the desired inter-disk partition desired.

In a preferred form, a stack of magnetic recording memory disks is assembled with each separated by a set of "scalloped" (see below) spacer rings, the array clamped between resilient and plates to comprise a pack adapted to be mounted upon a turntable in operative relation with a central partitioning cylinder. This cylinder is resiliently compled to the pack, preferably through adjustable centering hub-flexure means, and adapted to be thrust axially and be "self-returning".

The pneumatic partitioning to be effected with this assembly will admit entry of a prescribed transducer mount. Such a mount may be adapted to further deflect the disk pack and so complete partitioning, while carrying magnetic transducer means into operative contact with the selected disk surface. Thus, the pneumatic partitioning may be "partial".

In particular it will be seen that the preferred spacer embodiments each comprise a pair of complementarily-notched annuli, each being scalloped (one "inwardly", one "outwardly") to allow a certain partitioning radial air flow. According to certain related features and advantages such "scalloped-ring" spacers are easily fabricated and are convenient to assemble with any ordinary floppy pack.

The foregoing and other features, objects and advantages according to this invention will be more fully appreciated and become more apparent upon consideration of the following description of preferred embodiments taken in conjunction with the attached drawings, wherein like reference indicia denote like elements.

BRIEF DESCRIPTION OF THE DRAWINGS

FIG. 1 is a rather schematic elevation showing a simplified disk pack array in operative relation with rotation means, partition means and transducer means; while

DETAILED DESCRIPTION OF PREFERRED EMBODIMENTS

The improved disk pack spacer embodiments described here will be understood as advantageously adapted for use in "high speed" magnetic recording systems and will be better understood from a preliminary consideration of a high performance disk drive wherein improved flexible disk packs like those contemplated for use with the invention, may be advantageously employed. Accordingly, such an arrangement is shown in FIG. 1 and described as follows

Figure 1:
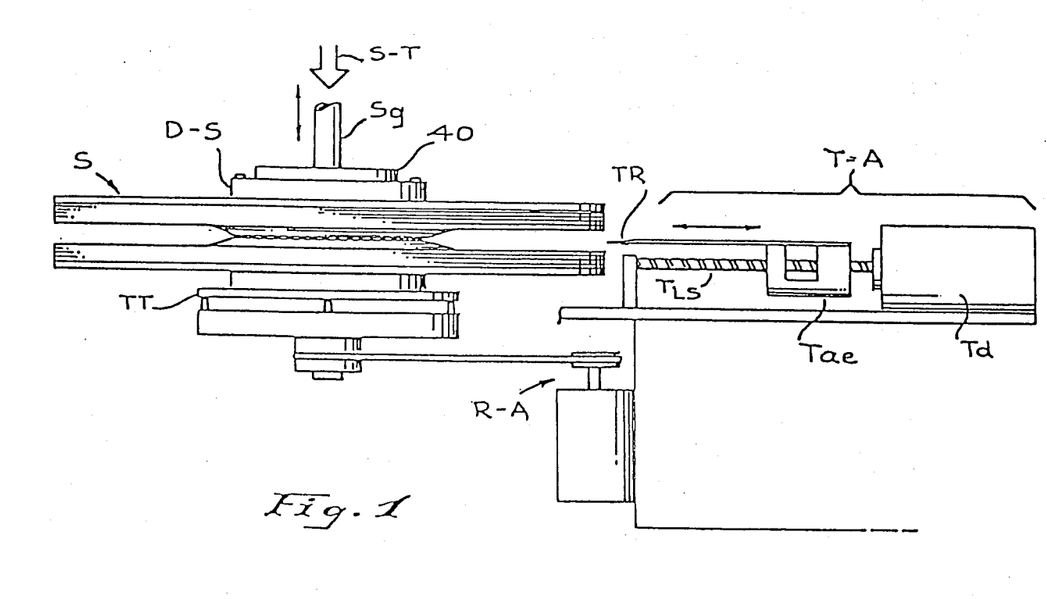

FIG. 1: GENERAL APPLICATION

FIG. 1 is a schematic, rather generalized functional showing of a disk drive array, including a flexible disk pack S mounted on a conventional turntable TT and operatively engaged with a "partitioning" piston 40 adapted to pneumatically partition the pack for access entry of a conventional transducer mount TR, as generally understood in the art. Here, and elsewhere, the materials, mechanisms and systems alluded to should be understood as conventionally constructed and operated as presently known in the art except where otherwise mentioned. Cited U.S. Ser. No. 774,312 describes details of such a disk drive array.

Accordingly, an improved flexible disk pack S, will be understood; one apt to be conventionally engaged by a rotation assembly R for prescribed high speed rotation (the "high performance" systems like those described will be understood to involve disk rotation on the order of at least several thousand rpm). This rotation assembly comprises conventional means, schematically indicated as including a turntable TT, and an associated drive R-A, including a motor, belt coupling and associated pulleys and gears, etc., as well understood in the art.

Once pack S is so engaged and so rotated, it is ready for transducer operations on a selected disk, access to which (by transducer TR, as known in the art) is best facilitated by a "partitioning", i.e., a separation between disks sufficient to expose the selected disk surface (at least partially), so as to accommodate entry of the transducer mount. Here, and elsewhere, it will be indicated that flexible disk packs like those described, are particularly apt for "pneumatic" partitioning from a central partitioning piston 40 which generates a partitioning jet.

Figure 2:
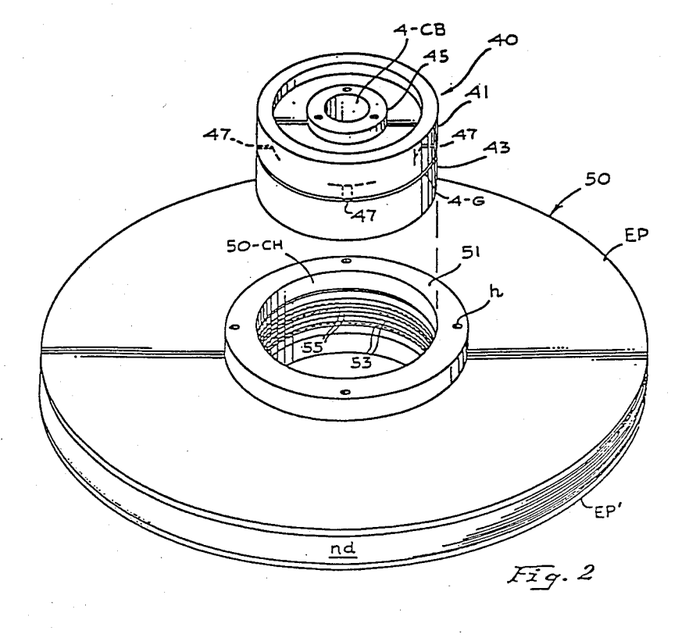
FIG. 2 is an upper perspective of a similar pack with a related partitioning cylinder shown exploded-away therefrom.

PARTITION PISTON (FIG. 2)

As seen in FIG. 2, piston 40 comprises a hollow cylinder adapted to be inserted and axially thrust by a precision actuation arrangement (not shown, but known in the art), into the hollow center (hub) of the disk pack—the axial position of piston 40 determining wher stack S is to be partitioned. Suitable piston positioning systems, for very precisely injecting such a cylinder into a disk pack and repositioning it very quickly and accurately, will be contemplated and understood by those skilled in the art and need not be depicted or detailed here.

The "positioning-actuate" system may be conventional, and thus is merely indicated schematically in FIG. 1 by arrow S-T (e.g., comprising a solenoid-driven linear actuator adapted to controllably thrust a driving linkage including rod $S_g$ along a prescribed path, and return it. The connection linkage is thus adapted to very precisely reciprocate the piston axially of the pack hub).

Transducer TR may be of conventional design and is part of a transducer assembly T-A understood as adapted to reciprocate TR (as indicated by the arrow) radially into, and out of, the pack S—preferably along a prescribed constant path, roughly midway across the axial height of the pack. This feature is highly advantageous. When operated in conjunction with a partitioning arrangement it will be understood as serving to separate the pack as to admit array TR.

The transducer and actuating means may be provided as well known in the art and need not be detailed here. But, by way of example only, an actuation drive motor $T_d$ is indicated as coupled to rotate a lead screw $T_{LS}$ on which the head mounting arm is mounted, being threadably engaged therewith via arm-extension $T_{ae}$ for precise translation into the pack (e.g., to access specific tracks on a selected magnetic disk surface, as is well known in the art and need not be detailed here).

DISK PACK (FIG. 2)

FIG. 2 indicated an exemplary flexible disk pack embodiment 50 shown in exploded relation with associated partitioning cylinder 40, and understood as suitable for using spacer means according to this invention, as described below.

Pack 50 will be understood as including an array of identical, commonly-supported, flexible disk records 55 stacked coaxially. Records 55 will be understood as mounted and retained, along with intermediate spacers 53, between a pair of opposed flexible end plates, EP, EP', being clamped fixedly between collars 51, 51'. Disks 55 are spaced-apart a prescribed uniform distance (inter-record "gap" g) with identical annular separator ring sets 53 which vent the pack hub radially being made radially "air permeable", by "oppositely-scalloped" ring pairs according to a feature hereof. The array of disks and inter-disk spacers is clamped firmly between end plates EP, EP' by a pair of opposed collars 51, 51' and held there, positioned using means known in the art (e.g., with positioning bolts or rivets threaded through holes h in collars 51, disks 55 and spacers 53; or by like fastener means as understood by workers in the art). The inner circumferences of disks 55, of spacers 53 and of collars 51, as so stacked and clamped together, are relatively congruent to define the sides of a cylindrical center hole (hub) 50-CH of prescribed diameter and height as known in the art.

Flexible disks 55 are of a type known in the art and, as workers will appreciate, may assume various dimensions and compatible constructions. A typical flexible disk comprises a thin polyester disk substrate, usually one to several mils thick (e.g., a well-known polyethelene terephthalate a few mils thick—1.5 mils preferred here—with a randomly oriented ferric oxide coating; disk diameter being approximately 12 inches with a center-hole about 2.5 inches in diameter). The disk will have a magnetic coating on at least one side to thus define a magnetic recording surface.

As generally indicated in FIG. 1, and well understood in the art, the entire pack S is adapted for engagement with an accommodating turntable array TT.

Figure 3:
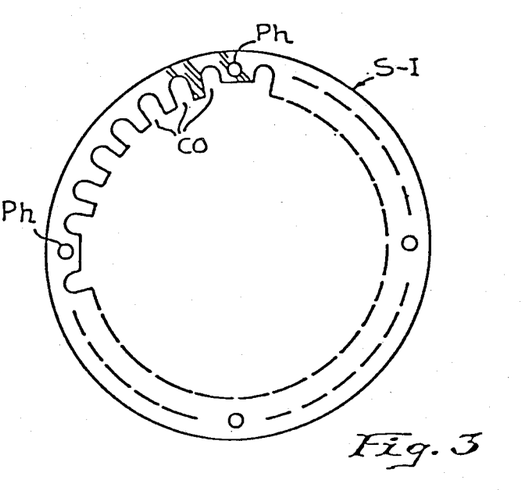
FIGS. 3 and 4 are plan views of first and second "scalloped ring" elements, respectively, of a first spacer embodiment; these being shown superposed in FIG. 5 with one ring indicated in phantom.
Figure 4:
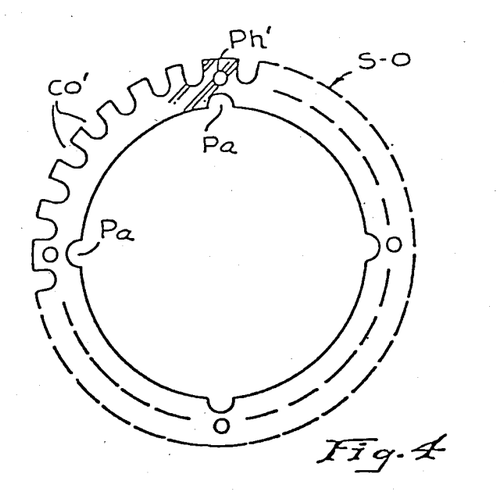
Figure 5:
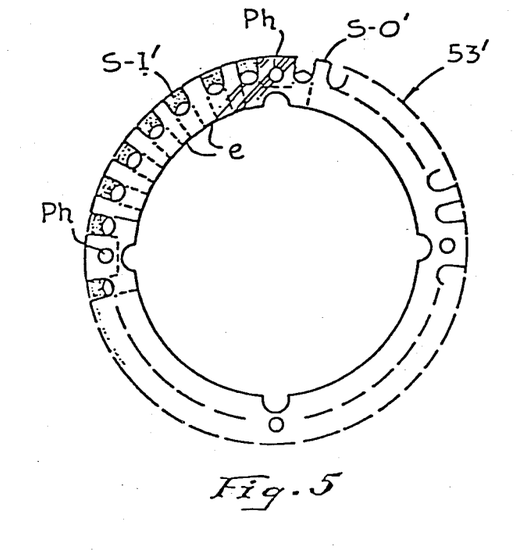

SCALLOP-RING SPACERS (FIGS. 3-5)

According to a principle feature, recording disks 55 are separated by spacer means 53, each comprising a pair of "oppositely-scalloped" rings, illustrated in FIGS. 3 and 4 and shown superposed in operative radial venting condition in FIG. 5. Each spacer pair 53 will be understood as identical, serving to maintain disks axially spaced a prescribed uniform separation distance (here, about 4 to 8 mils preferably—the rings being 2-4 mils thick preferably).

As mentioned, each set of spacer rings are "oppositely scalloped", for instance, as indicated in FIGS. 3 and 4 (somewhat to scale) wherein are shown an inwardly-scalloped ring S-I and an outwardly-scalloped ring S-O, respectively. More particularly, inwardly-scalloped ring S-I in FIG. 3 will be understood as comprising an annulus having an identical pattern of indentations, notchings or cutouts co distributed relatively uniformly about its inner periphery—except for interruption by the necessary "lands" to accommodate the positioning holes (e.g., the four positioning holes Ph indicated in FIG. 3).

Figure 8:
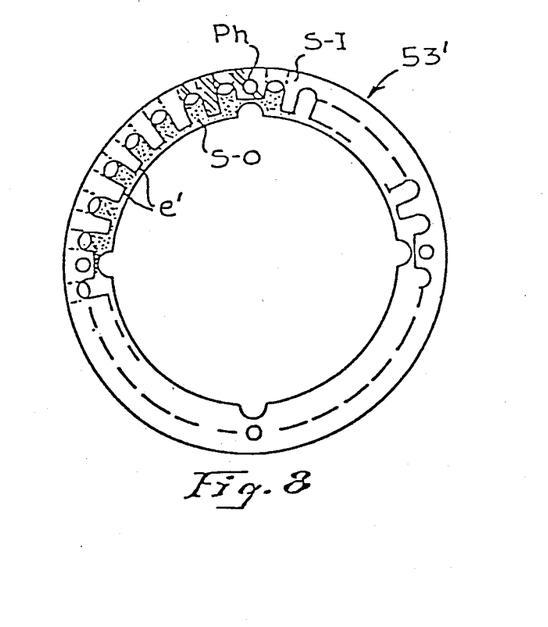

Companion outwardly-scalloped ring S-O shown in FIG. 4 will be understood as complementary to ring S-I in FIG. 3 having a complementary array of edge-notching adapted to cooperate with those of ring S-O so the two form a single spacer set when superposed (as indicated in FIG. 5, for instance) that is radially-venting. Cutouts co' about the outer periphery of ring S-O may be generally like those on the inner periphery of aforementioned rings S-I, being of uniform size and distributed somewhat uniformly about this periphery except for interruption by the positioning holes lands (see four positioning-hole-lands and positioning holes Ph' in FIG. 4). Also, ring S-O, while being congruent with ring S-I as to its outer periphery may be inwardly-congruent as in FIG. 5—but preferably, it extends inwardly somewhat therefrom as indicated in FIG. 8 (discussed below). In FIG. 5 ring S-I will be understood as superposed atop ring S-O (some of the scalloping on S-O in phantom in FIG. 5). In addition four semi-circular cutouts pa along the inner periphery of S-O will be understood as provided for accommodating positioning rods (used in assembly of the pack, etc., as known in the art).

For the embodiments of FIGS. 1-6 scalloped spacers of the following type are quite suitable: 0.5" wide Mylar ring with 2.5" ID; 3.0" OD and about 3 mils thick (1-15 mils); the slots co (see FIGS. 3, 4) should be cut out to a uniform width (are width). Four lands, or fastenor sites, SL, are provided equidistant about the rings S-I, S-O and are apertured (see Ph, Ph' FIGS. 3, 4) to accommodate the mentioned fastener means (extending between the top and bottom collars of the disk pack).

For added security, the recording disks may be adhesively secured to those ring spacers and/or provided with serrations or other frictional coupling means, as known in the art. The clamping forces between spacers and disks will be sufficient to secure the disks against relative rotation or radial creep, etc., as known in the art.

Although other related material may be used, it is preferred, as a feature of convenience herein, to form all rings S from Mylar sheeting or a like inexpensive, commonly-available relatively thin flat sheet stock (here, preferably about 3 mils thick). Preferably, the ring material is similar to the disk material (e.g., having a like "elasticity", etc.) but in certain cases may be quite different (e.g., metal, here). Workers will appreciate the tremendous convenience of forming spacer rings so simply—that is, simply punching-out, or otherwise cutting out, Mylar stock to form "scalloped rings" which are notched on their outer or inner periphery. The multi-ring spacers are thus readily adjustable in thickness (e.g., by superposing two or more S-I rings on a like number of S-O rings) and comprise material which is compatible, when pressed in contact, with the Mylar (floppy) disks. Such Mylar rings, being relatively strong and tough, also provide good position stability, etc., as clamped into the pack. Thus, as indicated in FIGS. 3 to 5, and as generally suggested in FIG. 6, such a pair of complementary, "oppositely-scalloped" spacer rings (S-O/S-I) each about 3 mils thick, may be inserted fixedly between each adjacent pair of floppy disks D (see FIG. 6). Disks D are, themselves, about 1 to 2 mils thick typically. Each paired-ring spacer so formed is thus made radially-venting for the indicated pneumatic flow-through.

As workers can see, the edge-slotting will be such as to maximize radial air flow and minimize pneumatic impedance (when the oppositely-slotted rings are properly paired and superposed). In certain cases, the complementary notchings may be positioned relative to one another so as to pass a reduced radial air flow (e.g., be slightly mismatched so only one-half of each slot communicates with its companion slot, thus attenuating air thru-put). Certain variations in ring materials and/or slot shape or size and/or relative positioning will occur to workers in the art.

Figure 6:
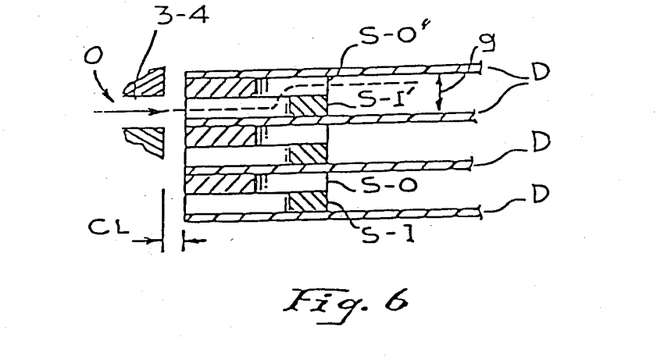
FIG. 6 is an enlarged, side view (in partial section) of a floppy pack including spacers like the above embodiment.

OPERATION: (FIG. 6)

Operation with such "oppositely scalloped" ring spacers is readily appreciated by those skilled in the art. Such will be exemplarily described with reference to FIG. 6. Here, a floppy disk pack, of the type described above, will be understood as mounted for typical operation—the pack comprising a plurality of flexible disks D, each separated, a prescribed uniform gap g, by a pair of scalloped ring spacers S of the type described above. Pairs of outwardly-scalloped and inwardly-scalloped spacers (S-O, S-I, respectively) are thus shown in schematic idealized section in FIG. 6. Also, a fragmentary portion of an inner pneumatic partitioning piston is functionally indicated by a jet port O, understood as a jet slit extending about the piston and adapted to direct partitioning air through any selected set of these radially-vented spacers—for instance, being here indicated as registerd opposite the upper spacer pair S-I'/S-O' (i.e., inwardly-scalloped ring S-I'). More particularly, the outer periphery of the jet piston surrounding port O will be understood as spaced a few mils (preferably 2 to 3 mils here—see clearance CL) from the inner periphery of the spacer-disk array; and pressurized air will be, selectively, directed radially outward from port O to pass through registered spacers S-I', S-O' (in that order) as indicated exemplarily by the dotted-line-arrow.

Here, with the spacers S each about 3 mils thick and port O assumed as about 3 to 4 mils in height, the port O will be understood as ideally, centered about the inwardly-scalloped spacer S-I' as roughly illustrated. A suitable burst of pressurized air (e.g., about 15 psi found suitable here) can thus be directed into S-I' and will proceed outwardly, through all the inner scallop passages (the piston co-rotating with the pack and spacers-)—then, after traversing about half the radial width of S-I, these air streams will be seen as diverted upward into the communicating outward identations of the companion (oppositely scalloped) spacer S-O. Thereafter, the streams will continue to travel radially outward into the gap g separating the selected pair of disk faces.

Also, these vented ring spacers will be understood as helping to maintain the recording disk D normally separated and lubricated by a thin film of "isolation air" (i.e., during "non-partition" times) as well as serving, during special partition times, to pass the partitioning air jet. Workers will recognize that such pneumatic separation depends upon the clearance dimension CL between the outer side walls of the partition piston P and the inner walls of pack centerhole 50-CH as indicated in FIG. 6. If this clearance is not above a certain minimum, a vacuum will result between disks D pulling them together; whereas if it is too large the air flow between disks may agitate them.

SPACER CONFIGURATIONS

Of course, the shape of the spacer indentations is typically a matter of choice. Preferably it will afford a maximum aperture/minimum pneumatic impedance and will generally be uniform about the ring periphery. A U-shaped, or somewhat rectangular, shape is preferred for the subject embodiments.

While the radial-lengths of the indentations may be a matter of choice, they must be complementary between ring parts, such that paired rings have a total summed indentation length that spans the radial width of the spacers to, thus, establish the desired radial pneumatic communication across the rings. The indentation patterns are preferably shaped and disposed to be "congruent circumferentially" between ring pairs—i.e., so that the indentations of a given ring may be aligned with those of a companion ring when the two are superposed. Patterns should also extend relatively uniformly about the periphery of both rings to promote uniform partitioning radial air-flow circumferentially about the selected gap.

Figure 7:
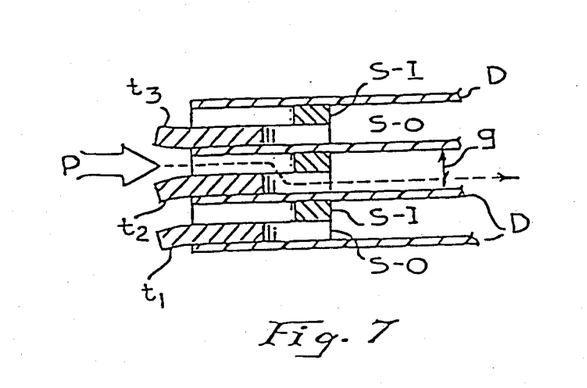
FIG. 7 is a like section with the spacers modified as a second embodiment, with these superposed in plan view of FIG. 8; while FIG. 9 re depicts FIG. 4 with the spacer center cut-out

MODIFIED SPACER EMBODIMENT WITH "INNER TABS" (FIGS. 7, 8)

FIG. 7 very schematically illustrates an embodiment understood as identical to that in FIG. 6 except as hereinafter described, with the spacer means modified so as to provide "inner tabs". Such tabs are intended to define an "entry throat" for enhanced piston-spacer air-flow, as described below. More particularly, ring pairs S-I, S-O (scalloped inwardly and outwardly, respectively, as before) are inserted as separators between floppy disk D in the same kind of pack and adapted to cooperate for pneumatic partitioning with an inner source of pressurized air—here generally indicated by arrow P and operating as the above described piston, etc.

However, in this case, the inner-scalloped rings S-I are superposed upon the outer-scalloped rings S-O. Also, each outer-scalloped rings S-O is further modified to include an inner tab portion (e.g., see tabs $t_1$, $t_2$, $t_3$) projected into the pack's hub (i.e., beyond the inner periphery of disks D and beyond the inner-scaling on companion range rings S-I) to co act with the jet partition means and produce this "entry throat" feature. That is, when the jet port is aligned opposite a selected gap g (and particularly opposite inner-scalloped ring S-I therein) and a burst of partitioning air pressure applied, it will be understood that this burst will deflect adjacent tabs (here $t_1$, $t_2$, $t_3$), away from S-I to form a "quasi-funnel" into the S-I indentations (i.e., forming an "entry throat" guiding more air-flow into the spacer channels and away from adjacent regions). This burst will generally follow the "dotted-line-arrow" illustrated, proceeding across the indented width of ring S-I and, being diverted downward, complete its traversal of the spacers by exiting through outer-scalloped ring S-O.

Tabs t will be seen to project inwardly sufficient to (and to comprise flexible material such as to) be so-deflected by the contemplated air burst. That is, the extent of tab projection (see overhang OH in FIG. 8, beyond inner-tips of notches on S-I) and the tab-stiffness (ring resilience) plus jet-pressure level will determine the degree of tab-bending (e.g., here for FIG. 8 embodiment, 15–20 psi preferred). With proper conditions, the jet will bend and divert the facing tabs resiliently away from the selected spacer indentations to more readily "funnel-in" partitioning air, while deflecting it away from mischievous interaction with adjacent spacers, as workers in the art will appreciate (e.g., often helpful to "starve" gaps adjacent the partitioned gap to increase pressure differential there). Workers will recognize that the materials (resilience) and dimensions will be chosen to optimize this "air funneling" effect.

ALTERNATE EMBODIMENTS

It will be appreciated that novel disk pack spacer arrangements and techniques, as here described in the indicated and other related recording systems, may be advantageously employed in various ways. Such arrangements will be seen as especially advantageous in conjunction with a "pneumatic-partitioning" arrangment as described. That is, while the described embodiments have involved a removable cartridge form of floppy disk pack, workers will understand that spacer means according to the instant invention may be used with other disk arrangements, such as in an array of floppy disks stacked fixed along a prescribed (horizontal or vertical) axis and susceptible of central pneumatic partitioning.

Workers in the art will recognize that novel, flexible disk packs such as those above described may be constructed in various ways and adapted for various advantageous applications with such "scalloped-ring" spacers. Such packs will be recognized as particularly apt for use with interior "pneumatic partitioning" means (such as with the hollow cylinder partitioning means described in cited U.S. Ser. No. 774,312 where details of its construction and operation are given).

Likewise, the scalloped separator rings may take other functionally-similar forms, the pattern of notchings or scallopings being modified to render any like regularly spaced array of edge projections.

Similarly, such spacers may be contemplated as useful with other partition means.

Workers in the art will recognize many features of advantage and surprising novel utility deriving from spacer design and construction along the described lines. They will recognize that, using such designs, pack cost may be minimized, especially where the spacer rings are manufactured from the same plastic as the floppy disks themselves, and where they are simple to manufacture and convenient to use, being inserted between disks, and clamped in place between simple collar means.

Figure 9:
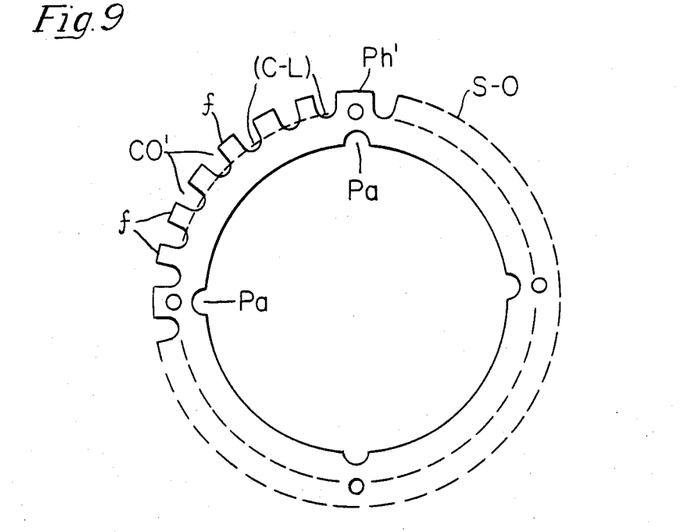
Figure 10:
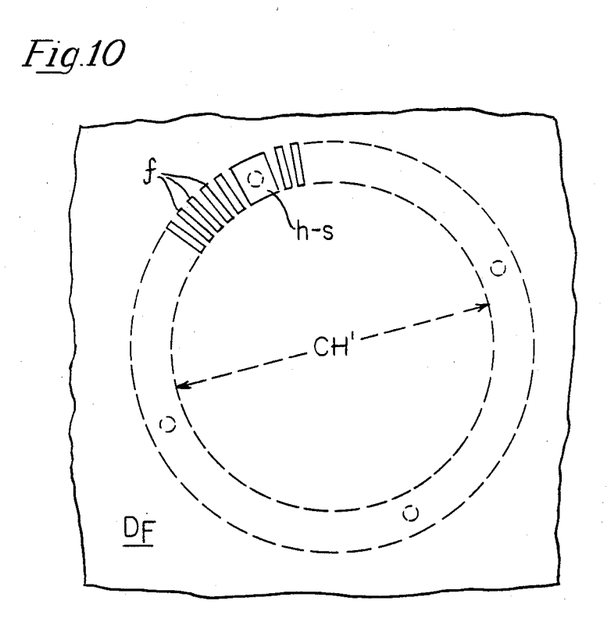
FIG. 10 shows like result, leaving spacer-fingers adhered on the adjacent disk.

And, where such clamping is inconvenient, other means may be used for fixing spacer location. For instance, a spacer configured as in FIGS. 4 and 9 (e.g., preferably made of plastic as above stated) may be bonded directly on its adjacent flexible (plastic) disk. Moreover, as suggested above, such a spacer may conveniently be stamped or otherwise cut to leave only its peripheral separating "finger" portions adhered on the flexible disk. Such is suggested in FIG. 9 by severance-line C-L (assume that plastic spacer S-O, and the underlying disk to which it is already bonded, are cut in circular fashion along circumferences C-L. Leaving only finger portions f adhered to the underlying disk). This result is indicated in FIG. 10 where (somewhat differently shaped) "fingers" f' (along with rod-lands h-s) are shown left bonded upon floppy disk $D_F$, it being assumed that the inner body of the associated spacer was cut-out (along with disk-center) to define a center-hole of diameter C-H'.

It will be understood that the preferred embodiments described herein are only exemplary and that they are susceptible of many modifications and variations in construction, arrangement and use, without departing from the spirit of the invention. For example, it has been assumed that "central pneumatic means" are necessary for (at least partly) partitioning the pack—however, while this is preferable, facilitating quick partitioning and a simplified transducer mount, other related means may be employed. In certain instances, with the disks adequately spaced by the "separating air stream", partitioning can be aided by means applied from outside the pack.

The above example of possible variations of the present invention are merely illustrative. Accordingly, the present invention is to be considered as including all possible modifications and variations coming within the scope of the invention as defined by the following appended claims.

What is claimed is:

1. In a method for providing for the selective pneumatic partitioning of a stack of co-rotatable flexible recording disks, this method including:

stacking said flexible disks together with intermediate radially-venting spacer means so as to form a disk pack, with the inner periphery of the disks retained together so as to define a center-bore, and the pack being adapted to engage high speed rotation means and also being arranged to be pneumatically parted between any selected pair of adjacent disks;

introducing axially-translatable pneumatic partition-jet means into said bore; and partitioning said pack by rotating it sufficient to induce a prescribed pumping between said disks, and positioning said jet means so as to direct one or more jet streams radially out through the spacer means defining the separation site; the improvement therewith of:

forming each said spacer means by adhering a spacer disk, including an annular peripheral array of identical separate spacer fingers on each disk adjacent disk center and thereafter removing all spacer disk portions except the fingers.

2. The combination as recited in claim 1 wherein each said finger array is formed by bonding a spacer disk on the respective recording disk, concentric therewith, the spacer disk being peripherally indented to form identical peripheral finger portions;

the cutting-away of the center portion of spacer disk to leave only said finger portions bonded on the disk.

3. The combination as recited in claim 2 where both the disks and the spacer means are plastic.

4. A method of providing novel spacer means between recording disks stacked in a pack comprising the steps, for forming each disk, of:

bonding a spacer disk on the respective recording disk, concentric therewith, the spacer disk being peripherally indented to form identical peripheral finger portions;

the cutting-away of the center portion of spacer disk to leave only said finger portions bonded on the disk.

5. The combination as recited in claim 4 where both the disks and the spacer-means are plastic.

* * * * *

UNITED STATES PATENT AND TRADEMARK OFFICE
CERTIFICATE OF CORRECTION

PATENT NO. : 4,707,752  Page 1 of 2

DATED : November 17, 1987

INVENTOR(S) : Ko Ko Gyi

It is certified that error appears in the above-identified patent and that said Letters Patent is hereby corrected as shown below:

```
Col. 1, line 19, change "bundled," to --handled,--;
                change "wiht" to --with--.
Col. 2, line 11, change "fins" to --fine--;
        line 31, change "sir" to --air--.
Col. 3, line  8, change "cylidrical," to --cylindrical,--;
        line 25, change "bold" to --hold--;
        line 33, change "advantage" to --advantages--;
        line 56, change "and" to --end--.
Col. 4, line 32, change "re depicts" to --re-depicts--;
        line 33, change "result," to --results,--;
        line 58, change "art" to --art,--.
Col. 5, line 19, change "wher" to --where--.
Col. 7, line  7, change "(are width)." to --(arc width).--;
                change "fastenor" to --fastener--;
        line 13, change "those" to --these--.
Col. 8, line 33, change "disk" to --disks--;
        line 56, change "parts," to --pairs,--.
Col. 9, line 11, change "disk" to --disks--;
        line 21, change "inner-scaling" to
                --inner-scalloping--;
        line 22, change "co act" to --co-act--.
```

UNITED STATES PATENT AND TRADEMARK OFFICE
CERTIFICATE OF CORRECTION

PATENT NO. : 4,707,752

DATED : November 17, 1987

INVENTOR(S) : Ko Ko Gyi

It is certified that error appears in the above-identified patent and that said Letters Patent is hereby corrected as shown below:

Col. 10, line 37, change "C-L." to --C-L,--;
change "Leaving" to --leaving--.

Signed and Sealed this

Ninth Day of August, 1988

Attest:

DONALD J. QUIGG

*Attesting Officer*  *Commissioner of Patents and Trademarks*